United States Patent Office 3,329,485
Patented July 4, 1967

3,329,485
METHOD FOR THE PREPARATION OF BORON COMPOUNDS
Samuel Witz, West Covina, and Joseph L. Shepherd, Sunland, Calif., and Ellis I. Hormats, Rochester, N.Y., assignors to Aerojet-General Corporation, Azusa, Calif., a corporation of Ohio
No Drawing. Filed Mar. 23, 1959, Ser. No. 801,390
21 Claims. (Cl. 23—204)

This invention relates primarily to a new and improved method for preparing alkyldihaloborines and dihaloborines. Trialkylborons and diborane can be obtained from the alkyldihaloborines and the dihaloborines thus prepared by means of disproportionation.

The alkyldihaloborines and the trialkylboron compounds are useful as high energy fuels for both rockets and air breathing engines. The alkyldihaloborines, such as methyldichloroborine, produced by the method of this invention readily disproportionate to form trialkylborons, such as trimethylboron. Trialkylborons react with hydrogen in a silent discharge tube to produce alkylated diboranes, such as tetramethyldiborane, as more fully disclosed in assignee's copending United States Patent Application Ser. No. 470,240, filed Nov. 22, 1954. Also, trialkylborons, such as trimethylboron, react with diborane to form tetraalkyldiboranes such as tetramethyldiborane. Tetraalkyldiboranes, when added to hydrocarbon fuels such as gasoline in amounts corresponding to about one percent by weight, dramatically improve the combustion characteristics of the fuels in internal combustion engines, as more fully disclosed in assignee's U.S. patent application No. 470,240.

Previously known procedures for preparing trialkylborons, such as through the Grignard reagent, are costly and tedious. The present invention provides an inexpensive, rapid and convenient method of synthesizing trialkylborons from cheap and readily available starting materials.

Dihaloborines such as dichloroborine, yield diborane upon disproportionation. Diborane is an excellent high energy fuel but its use has been severely limited heretofore due to lack of a convenient and inexpensive method for preparing it in high yield. Diborane is particularly valuable as a high energy fuel for use in conventional liquid bi-propellant rockets. When used for this purpose, diborane is normally burned with an oxidizer, such as fuming nitric acid, in a rocket chamber. The gases thus produced are expelled through an exhaust nozzle and thrust is imparted to the motor, thereby producing forward motion of the rocket. Diborane also finds valuable use in vulcanizing rubber, as disclosed in United States Patent 2,558,559.

We have found that alkyldihaloborines and dihaloborines are produced by reacting borontrihalides with alkanes at elevated temperatures. This reaction proceeds according to the general reaction scheme set forth below:

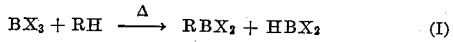

wherein R is alkyl and X is halogen. The alkyldihaloborines thus formed readily disproportionate to form the corresponding trialkylborons according to the general reaction scheme set forth below:

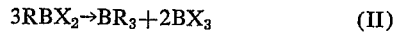

wherein R and X are as defined above. The dihaloborines formed in reaction scheme (I) disproportionate to yield diborane according to the general reaction scheme set forth below:

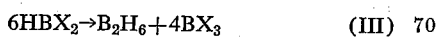

wherein R and X are as defined above.

Disproportionation of the alkyldihaloborines of this invention can easily be accomplished by simply isolating them, preferably under vacuum or in an inert atmosphere such as nitrogen because of the pyrophoric nature of the $BR_3$ products. Alkyldihaloborines thus isolated readily undergo disproportionation according to reaction scheme (II), above. The dihaloborines of this invention can be rapidly disproportionated, and the resulting diborane quantitatively recovered, by treating them in the apparatus, and according to the method, described in assignee's copending U.S. patent application Ser. No. 801,395, filed concurrently with the present application.

To more clearly illustrate our invention, the following examples are presented. It should be understood that these examples serve merely as a means of illustrating the invention and should not be construed as limiting the invention to the particular conditions set forth therein.

EXAMPLE I

*Preparation of methyldichloroborine*

A mixture of 30 cc. of $BCl_3$ and 144 cc. of methane was heated at 750°–800° C. for 15 minutes. The ratio of the reactants was 30:144, or about 1:5, the reactant quantities being given as volumes of gas at standard temperature and pressure (S.T.P.). As is well known, the volume ratio of gases at a given temperature and pressure is equivalent to the molar ratio of the gases. A total of 32.8 cc. (gas at S.T.P.) was recovered as a −196° C. condensate. An infrared analysis indicated that this mixture consisted of 20.7 cc. unreacted $BCl_3$, 0.4 cc. $BHCl_2$, 6.4 cc. HCl, and 5.4 cc. $CH_3BCl_2$ (methyldichloroborine). This represented a 31% conversion of the $BCl_3$, with 58% of the converted boron being recovered as $CH_3BCl_2$ and 4% as $BHCl_2$.

EXAMPLE II

*Preparation of trimethylboron*

The methyldichloroborine is separated from the reaction mixture of Example I by fractional distillation. The methyldichloroborine thus separated is placed in vacuo wherein it disproportionates to yield trimethylboron and borontrichloride. The trimethylboron is separated from the disproportionation mixture by a continuous stripping process.

It is necessary to conduct the alkane-borontrihalide reaction of this invention at an elevated temperature, preferably within the range from about 500° to about 800° C. On the other hand, temperature is not critical to the disproportionation of the alkyldihaloborines, the only effect of temperature variation in this case being a corresponding increase or decrease in reaction rate. For reasons of economy, it is preferred to carry out this disproportionation at room temperature.

In carrying out the alkane-borontrihalide reaction of the present invention, good results are obtained when the molar ratio of the alkane to the borontrihalide is within the limits of from about 1:1 to about 10:1, the optimum ratio being about 5:1.

In practicing the process of the present invention, the reaction between the alkane and the borontrihalide can be effected in a static system or a flow system. Separation of products from this reaction can be accomplished by methods well-known to those skilled in the art, such as by fractional condensation. Likewise, the mixtures resulting from disproportionation of the alkydihaloborines can be accomplished by methods familiar to those skilled in the art, a preferred method being stripping, because of the greater volatility of the trialkylboron components of the mixtures.

Trialkylborons can be prepared by the novel method of our invention in one continuous operation, without olating any intermediate products, if desired. Thus, ialkylboron compounds can be separated directly from ιe conglomerate reaction mixture of the alkane-boron-ihalide reaction (rather than from the disproportiona-on mixture of an isolated intermediate product as taught y Example II) within the scope of our invention. emoval of the trialkylboron compounds from the alkane-orontrihalide reaction mixtures can be accomplished by tripping or other suitable means well known to those killed in the art.

It will be recognized that a good portion of our boron rihalide starting material is recoverable as a by-product f disproportionation reactions II and III. This by-product oron trihalide can be recirculated to react with more lkane, according to reaction scheme I, if desired. It goes without saying that this high recovery of starting material s of great economic significance to our process and one of its principal advantages.

It will be appreciated that a wide variety of alkyl-oron compounds can be prepared by the method of our nvention. For example, borontribromide reacts with ιexane, at an elevated temperature, to yield hexyldibromo-orine and dibromoborine which upon disproportionation ield trihexylboron and diborane, respectively. It is within he scope of our invention to produce trialkylborons having more than one type of alkyl radical present in the nolecule. For example, a mixture of ethyldipropylboron ind other trialkylboron compounds can be produced by reacting a mixture of ethane and propane with a boron-rihalide, such as borontriiodide, at an elevated temperature and effecting disproportionation of the resulting ιlkyldiiodoborine products. Other alkylboron compounds can be prepared by the method of our invention by simply employing appropriate starting materials in the manner taught herein.

We claim:

1. The method of preparing boron compounds which comprises reacting a borontrihalide with an alkane at an elevated temperature from about 500° C. to about 800° C., and recovering said boron compounds.

2. The method of preparing alkyldihaloborines and dihaloborines which comprises reacting a borontrihalide with an alkane at an elevated temperature, and recovering alkyl dihaloborines and dihaloborines, the halogens of said borontrihalide having an atomic weight in excess of 35.

3. The method of preparing trialkylborons which comprises reacting a borontrihalide with an alkane at an elevated temperature to form an alkyldihaloborine, and effecting disproportionation of the alkyldihaloborine to form the corresponding trialkylboron, the halogens of said borontrihalide having an atomic weight in excess of 35.

4. The method of preparing trialkylborons which comprises reacting a borontrihalide with an alkane at a temperature of from about 500° to about 800° C., to form an alkyldihaloborine, and effecting disproportionation of the alkyldihaloborine to form the corresponding trialkylboron.

5. The method of preparing trialkylborons which comprises reacting an alkane with a borontrihalide, in a molar ratio of from about 1:1 to about 10:1 and at a temperature of from about 500° to about 800° C., to form an alkyldihaloborine and effecting disproportionation of the alkyldihaloborine to form the corresponding trialkylboron.

6. The method of claim 5 wherein the molar ratio of the alkane to the borontrihalide is about 5:1.

7. The method of claim 5 wherein the disproportionation of the alkyldihaloborine is carried out in a vacuum.

8. The method of preparing trimethylboron which comprises reacting methane with a borontrihalide at an elevated temperature from about 500° to about 800° C. to form methyldihaloborine, and effecting disproportionation of the methyldihaloborine to form trimethylboron and recovering trimethylboron.

9. The method of preparing trimethylboron which comprises reacting methane with borontrichloride, in a molar ratio of from about 1:1 to about 10:1 and at a temperature of from about 500° to about 800° C., to form methyldichloroborine, and effecting disproportionation of the methyldichloroborine to form trimethylboron.

10. The method of claim 9 wherein the molar ratio of the methane to the borontrichloride is about 5:1.

11. The method of claim 9 wherein the disproportionation is carried out in a vacuum.

12. The method of preparing trihexylboron which comprises reacting hexane with borontribromide at an elevated temperature to form hexyldibromoborine, and effecting disproportionation of the hexyldibromoborine to form trihexylboron.

13. The method of preparing alkyldihaloborines and dihaloborines which comprises reacting an alkane with a borontrihalide, in a molar ratio of from about 1:1 to about 10:1 and at a temperature of from about 500° to about 800° C.

14. The method of preparing methyldichloroborine and dichloroborine which comprises reacting methane with borontrichloride in a molar ratio of from about 1:1 to about 10:1 and at a temperature of from about 500° to about 800° C.

15. The method of preparing diborane which comprises reacting a borontrihalide with an alkane at an elevated temperature from about 500° to about 800° C. to form an alkyldihaloborine and a dihaloborine, effecting disproportionation of the dihaloborine to form diborane and recovering diborane.

16. The method of preparing trialkylborons which comprises reacting a borontrihalide with an alkane at an elevated temperature and separating trialkylboron from the reaction mixture.

17. The method of preparing trialkylborons which comprises reacting a borontrihalide with an alkane at a temperature of from about 500° to about 800° C., and continuously separating trialkylboron from the reaction mixture.

18. The method of preparing trialkylborons which comprises reacting a borontrihalide with an alkane at an elevated temperature, and continuously stripping trialkylboron from the reaction mixture.

19. The method of preparing trialkylborons which comprises reacting an alkane with a borontrihalide in a molar ratio of from about 1:1 to about 10:1 and at an elevated temperature, and continuously separating trialkylboron from the reaction mixture.

20. The method of preparing trialkylborons which comprises reacting an alkane with a borontrihalide in a molar ratio of about 5:1 and at a temperature of from about 500° to about 800° C., and continuously stripping trialkylboron from the reaction mixture.

21. The method of claim 13 wherein the molar ratio of said alkane to said borontrihalide is about 5:1.

References Cited

Booth: Boron Trifluoride and Its Derivatives, pp. 170, 171, John Wiley (1949).

Carpenter: ARS Journal, vol. 29, pages 10 and 13 to 14 (Jan. 1959).

Gasselin: Annales de Chimie et de Physique, Seventh Series, vol. 3, pp. 9–13 (1894).

OSCAR R. VERTIZ, *Primary Examiner.*

LEON D. ROSDOL, ROGER L. CAMPBELL, L. A. SEBASTIAN, *Examiners.*

R. D. MORRIS, M. WEISSMAN, *Assistant Examiners.*